Patented Aug. 11, 1925.

1,548,854

UNITED STATES PATENT OFFICE.

HENRY M. SCHLEICHER, OF BOSTON, MASSACHUSETTS, ASSIGNOR TO AMERICAN METAL COMPANY, LTD., OF NEW YORK, N. Y., A CORPORATION OF NEW YORK.

PRODUCTION OF ANTIMONY.

No Drawing.    Application filed November 11, 1924. Serial No. 749,337.

*To all whom it may concern:*

Be it known that I, HENRY M. SCHLEICHER, a citizen of the United States, residing at Boston, in the county of Suffolk, State of Massachusetts, have invented certain new and useful Improvements in the Production of Antimony; and I do hereby declare the following to be a full, clear, and exact description of the invention, such as will enable others skilled in the art to which it appertains to make and use the same.

This invention relates to the recovery of antimony from lead bullion and from other sources.

It is the object of the invention to provide a simple and economical process for the separation of metallic antimony from materials containing it and to permit the recovery likewise of caustic alkali which is used in the primary step of separation.

As an example of the application of the invention, lead bullion containing antimony may be subjected to oxidation in the presence of caustic soda preferably disposed as a molten layer upon the bath of lead. The oxidation results in the separation of the antimony and its combination with sodium to form sodium antimonate $Na_3SbO_4$. When the antimonate is treated with water it decomposes and forms pyro-antimonate of sodium which is relatively insoluble in the solution and can be separated readily therefrom. The reactions are substantially as follows:

(1) $6NaOH + Sb_2O_5 = 2Na_3SbO_4 + 3H_2O$ (2) $2Na_3SbO_4 + 3H_2O = Na_2H_2Sb_2O_7 + 4NaOH$ or (2) $2Na_3SbO_4 + 9H_2O = Na_2Sb_2O_6 \cdot 7H_2O + 4NaOH$ depending on conditions.

While the sodium antimonate has certain uses and is available as a market product, it is nevertheless desirable to separate the antimony therefrom in a metallic form and to recover the sodium hydroxide which can be reused in the process.

In carrying out the invention the sodium pyro-antimonate, which may be derived from the source indicated or from any other source, is first mixed with a reducing agent such as charcoal. From 15 to 25% of charcoal based on the weight of the pyro-antimonate is preferably used. The mixture is then heated with the resulting production of an alloy of antimony and metallic sodium containing substantially equal molecular proportions of these elements, that is to say, about 84% of antimony and 16% of sodium. The proportion of sodium in the alloy will vary and depends to some extent upon the conditions under which the reduction is effected. It is always present, however, in some proportion.

The alloy of sodium and antimony is brittle and can be pulverized readily. It is reduced to a relatively fine condition and is then immersed in water. The water immediately reacts with the metallic sodium, forming sodium hydroxide or caustic soda, and metallic antimony is separated in a substantially pure form.

To insure success it is necessary that the alloy be substantially comminuted as the reaction is otherwise superficial. It is feasible, however, to subject the alloy in a pebble mill or similar pulverizing apparatus to the action of water with resulting practically complete separation of antimony and sodium. The amount of water should be kept as low as possible to avoid unnecessary dilution of the caustic soda solution.

To complete the process the metallic antimony can be furnaced either to pure metal or to oxide and the caustic solution can be concentrated to produce caustic soda. This can be fused if desired and produced thus in the anhydrous form.

The invention is particularly useful since it permits the recovery of the elements present in the sodium antimonate in useful form. The recovery is accomplished effectively and economcially and the products are in condition for immediate use.

While the details of the operation are those best adapted to accomplish the desired results, it is recognized that various changes in these details and particularly in the proportions of the reacting substances can be made without departing from the invention or sacrificing its advantages. Potassium can be used as a substitute for sodium but is, of course, more expensive.

I claim:

1. The process of separating metallic antimony from compounds containing it, together with an alkali metal, which comprises subjecting the compound to the action of a reducing agent and treating the resulting alloy with water.

2. The process of separating metallic antimony from compounds containing it, together with an alkali metal, which comprises subjecting the compound to the action of a reducing agent, comminuting the resulting alloy and treating it with water.

3. The process of separating metallic antimony from materials containing it, which comprises converting the antimony into a compound with an alkali metal, reducing that compound and treating the resulting alloy with water.

In testimony whereof I affix my signature.

HENRY M. SCHLEICHER.